US010118171B2

(12) United States Patent
Woodruff et al.

(10) Patent No.: US 10,118,171 B2
(45) Date of Patent: Nov. 6, 2018

(54) ION-EXCHANGE COMPOSITION COMPRISING A COMPLEX OF SUPPORT PARTICLES, DISPERSANT, AND ELECTROSTATICALLY BOUND LAYERING PARTICLES

(71) Applicant: DIONEX CORPORATION, Sunnyvale, CA (US)

(72) Inventors: Laurence A. Woodruff, San Jose, CA (US); Christopher A. Pohl, Union City, CA (US); Jeffrey S. Rohrer, Sunnyvale, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 336 days.

(21) Appl. No.: 14/814,451

(22) Filed: Jul. 30, 2015

(65) Prior Publication Data

US 2017/0028394 A1 Feb. 2, 2017

(51) Int. Cl.
| | | |
|---|---|---|
| B01J 43/00 | (2006.01) |
| B01D 15/36 | (2006.01) |
| B01J 41/20 | (2006.01) |
| B01J 41/05 | (2017.01) |
| B01J 41/09 | (2017.01) |
| B01J 47/016 | (2017.01) |

(52) U.S. Cl.
CPC ............ *B01J 43/00* (2013.01); *B01D 15/363* (2013.01); *B01J 41/05* (2017.01); *B01J 41/09* (2017.01); *B01J 41/20* (2013.01); *B01J 47/016* (2017.01)

(58) Field of Classification Search
None
See application file for complete search history.

(56) References Cited

U.S. PATENT DOCUMENTS

| | | | |
|---|---|---|---|
| 4,101,460 A | 7/1978 | Small et al. | |
| 4,376,047 A | 3/1983 | Pohl | |
| 5,324,752 A | 6/1994 | Barretto et al. | |
| 5,532,279 A | 7/1996 | Barretto et al. | |
| 5,936,003 A * | 8/1999 | Pohl ........................ | C08F 8/44 210/198.2 |
| 5,968,363 A * | 10/1999 | Riviello ............... | B01D 15/362 210/198.2 |
| 6,248,798 B1 | 6/2001 | Slingsby et al. | |
| 9,132,364 B2 * | 9/2015 | Srinivasan ............... | B01J 39/26 |
| 2011/0210055 A1 * | 9/2011 | Srinivasan ............... | B01J 39/26 210/198.2 |

OTHER PUBLICATIONS

DIONEX Product Manual, CarboPac PA20, Doc. No. 031884, Jul. 2011, 45 pages.
DIONEX Product Manual, Disposable Electrodes, Doc. No. 065040, Rev. 7, Jan. 2009, 50 pages.
DIONEX Product Manual, Eluent Generator Cartridges, 065018, Jun. 2014, 86 pages.

* cited by examiner

*Primary Examiner* — Joseph D Anthony (57) ABSTRACT

An ion-exchange composition suitable for use in ion exchange chromatography, comprising neutral vinyl polymer support particles irreversibly bound to a dispersant having ionizable sites which are un-ionized at a neutral pH and which are ionized under highly acidic or highly basic conditions, and fine layering particles functionalized with ion-exchanging sites on the surfaces thereof. A portion of the ionizable sites are ionized and bound electrostatically to a portion of the fine layering particles ion-exchanging sites, producing a support particle-dispersant-fine layering particle complex.

3 Claims, 9 Drawing Sheets

Run time comparisons for separations using the complexes of Examples 4 – 9. For Examples 5 – 9, the pH values are between 14 and 12

| | Fucose (min) | Galactos-amine (min) | Glucosamine (min) | Galactose (min) | Glucose (min) | Mannose (min) |
|---|---|---|---|---|---|---|
| Example 4 | 2.59 | 4.65 | 5.69 | 6.54 | 7.35 | 8.49 |
| pH | Run Time (min) | Run Time (min) | Run Time (min) | Run Time (min) | Run Time (min) | Run Time (min) |
| 14.0 | 2.66 | 4.85 | 5.96 | 7.00 | 7.83 | 9.03 |
| 13.5 | 2.62 | 4.80 | 5.88 | 6.95 | 7.74 | 8.90 |
| 13.0 | 2.16 | 3.75 | 4.54 | 5.17 | 5.77 | 6.62 |
| 12.5 | 1.28 | 1.83 | 2.09 | 2.34 | 2.54 | 2.82 |
| 12.0 | 1.04 | 1.26 | 1.37 | 1.46 | 1.54 | 1.65 |

Run time comparisons for separations for different analytes using various pH values FIG. 8A
Run Time vs aggl pH Fucose FIG. 8B
Run Time vs aggl pH Glucosamine FIG. 8C
Run Time vs aggl pH Galactosamine FIG. 8D
Run Time vs aggl pH Galactose Run time comparisons for separations for different analytes using various pH values

FIG. 9A

Run Time vs aggl pH Glucose

FIG. 9B

Run Time vs aggl pH Mannose

ION-EXCHANGE COMPOSITION COMPRISING A COMPLEX OF SUPPORT PARTICLES, DISPERSANT, AND ELECTROSTATICALLY BOUND LAYERING PARTICLES

FIELD OF THE INVENTION

The present invention relates to a composition which is useful for performing ion-exchange chromatography. More particularly, the present invention relates to an improved composition and method for preparing an ion-exchange composition in which resin support particles are irreversibly attached to fine resin layering particles via a dispersant material. The composition of the present invention can be used in conventional column chromatography but is most particularly suited for high performance liquid chromatography.

BACKGROUND OF THE INVENTION

Generally, ion-exchange chromatography employs the use of columns. These columns are packed with a resin, often in the form of granules having sorptively active surfaces or surfaces which have been coated with a substance which is sorptively active.

It is well recognized in the art that excellent chromatographic supports consist of a plurality of discrete particles of regular shape, preferably spheres, having surfaces with a large number of superficial shallow pores. In order that columns will give reproducible chromatographic results, support particles ideally should be regular in their surfaces and their surface characteristics easily reproducible.

Materials for performing liquid chromatographic analyses are known where only the thin outer surfaces of the chromatographic support materials are available for actively exchanging ions with liquid media. For example, Small et al., in U.S. Pat. No. 4,101,460 (1978) describes the preparation and use of an ion-exchange composition comprising Component A, an insoluble synthetic resin substrate having ion-exchanging sites, at least on its available surface, and having Component B, a finely divided insoluble material, irreversibly attached thereto.

In the above prior art electrostatic methods, the resin support particles are typically formed by a suspension polymerization process. A dispersant material is frequently used in polymerization of the resin support particles to maintain separate particles in the reaction solution as they are produced, preventing the desired size particles from sticking to each other and forming a larger agglomerate particle. The resin support particles are then lightly sulfonated by exposing them at room temperature to concentrated sulfuric acid for a few minutes. This creates a very thin layer of sulfonate sites on the surface of the resin support particle and allows for electrostatic attachment of fine resin layering particles such as aminated latex beads.

Thus, in the above prior art electrostatic methods it is necessary to functionalize the fine layering particles by creating a positive or negative charge, at least at the surfaces of those particles, for the electrostatic attachment. This has been done by aminating or sulfonating latex-derived particles. If the latex is aminated, the resin support particles are sulfonated. In the case where the latex is sulfonated, the resin support particles are aminated. The latex and support particles are then brought into contact with each other, resulting in a monobead coat of latex particles electrostatically attached to the surface of the resin support particles. This produces a pellicular anion-exchange or pellicular cation-exchange resin bead.

Barretto et al., U.S. Pat. No. 5,532,279 ("the '279 patent") describe at column 1-3 various prior art processes for making agglomerates of such ion-exchange Component B particles layered electrostatically onto Component A particles. Further, it describes an ion-exchange composition comprising synthetic resin support particles, dispersant capable of suspending the support particles in an aqueous medium to inhibit or prevent agglomeration, and fine synthetic resin layering particles. The complex can be formed by contacting a suitable dispersant with monomer in an aqueous solution in which the monomer is insoluble. Under suitable conditions for suspension polymerization, the monomer will polymerize to form resin support particles having dispersant irreversibly attached to those particles. The dispersant is irreversibly attached to the synthetic resin support particles either by covalent bonding or permanent physical entanglement. The dispersant is also attached to the fine layering particles, either by covalent bonding or by electrostatic forces. The result is formation of a support particle-dispersant-layering particle complex.

The '279 patent discloses that the ion-exchange composition can be made by forming a synthetic resin support particle-dispersant complex in which the dispersant is irreversibly attached to the support particles. The complex can then be mixed in aqueous slurry form with fine resin layering particles under conditions suitable to form a resin support particle-dispersant-resin layering particle complex in which the resin layering particles are irreversibly attached to the dispersant. In effect, the dispersant forms an irreversible bridge between the support and layering particles. The dispersant is irreversibly attached to the resin support particles. The dispersant contains ionic or potentially reactive functional groups that can be exploited through further chemistry after polymerization of the support particles. Ion-exchange compositions of the type described in the '279 patent are sold by Thermo Fisher Scientific under the trade names OmniPac™ including the OmniPac™ PAX-100, the OmniPac™ PAX-500 the OmniPac™ PCX-100 and the OmniPac™ PCX-500 columns.

SUMMARY OF THE INVENTION

In one embodiment of the invention, a method is provided for producing an ion-exchange composition suitable for use in ion exchange chromatography. The method comprises the steps of forming a first complex of neutral vinyl polymer support particles irreversibly bound to a dispersant. The dispersant has ionizable sites which are un-ionized at a neutral pH and which are ionized under highly basic or highly acidic conditions.

A mixture is formed between the complex and an aqueous slurry of fine layering particles, functionalized with ion-exchanging sites on the surfaces of the fine layering particles, at the highly basic or highly acidic conditions so that the dispersant includes the ionized sites. The dispersant ionized sites electrostatically bind to a portion of the fine particle ion-exchanging sites to produce a support particle-dispersant-fine layering particle complex.

In another embodiment of the invention, an ion-exchange composition is formed suitable for use in ion exchange chromatography. Neutral vinyl polymer support particles are irreversibly bound to a dispersant having ionizable sites which are un-ionized at a neutral pH and which are ionized under highly acidic or highly basic conditions. Fine layering particles are functionalized with ion-exchanging sites on the surfaces thereof. A portion of the ionizable sites are ionized and bound electrostatically to a portion of the fine layering particles ion-exchanging sites to produce a support particle-dispersant-fine layering particle complex.

DETAILED DESCRIPTION OF EMBODIMENTS

The ion-exchange composition of the present invention includes neutral vinyl polymer (e.g. synthetic resin) support particles, dispersant capable of suspending the support particles to inhibit or prevent agglomeration in an aqueous medium, and fine synthetic resin layering particles. The dispersant is irreversibly attached, either by covalent bonding or by permanent entanglement or both to the support particles, and also attached electrostatically to the layering particles.

The neutral vinyl polymer support particles may be formed from any synthetic resin material which is reactive with the particular dispersant of interest such as described in the '279 patent, incorporated by reference. For example, synthetic polymer resins such as poly (phenol-formaldehyde), polyacrylic, or polymethacrylic acid, graft polymers of styrene on polyethylene or polypropylene, poly-(vinylaromatic) resins such as those derived from styrene, alpha-methylstyrene, vinyltoluene, styrene, and similar unsaturated monomers, monovinylidene monomers and copolymers are suitable. The neutral vinyl support particles of the present invention, like those of the '279 patent, are "neutral," i.e. do not include ion-exchanging sites for electrostatic attachments as in U.S. Pat. No. 4,101,468.

The support particles of the present invention can be formed by well known suspension polymerization techniques which involve suspending droplets of monomer in an aqueous medium in which it is insoluble as described in the '279 patent. Thus, the resin support particles can comprise beads of cross-linked polymer or copolymer, such as styrene-divinylbenzene copolymer, containing between about 2% to about 100% divinylbenzene monomer by weight. In its most preferred embodiment, the styrene-divinylbenzene copolymer contains between about 25% to about 80% divinylbenzene monomer by weight.

The fine layering particles of the present invention can be formed from a synthetic polymer (e.g. resin), which is chosen to be suitably attracted to a particular dispersant material and irreversibly attach to the dispersant at one or more of its functional groups. Preferably, the layering particles are formed by emulsion polymerization and will be derived from a monomer mixture which is insoluble in the solvents with which they will be contacted. The polymerization can be performed by conventional emulsion polymerization techniques, such as by heating and stirring a suspension of monomers in a suitable solvent in the presence of a suitable emulsifying agent. Alternatively, the polymerization may be carried out by a suspension, bulk or solution process followed by grinding the resin to a desired size by mechanical means such as ball mills, rod mills or the like.

The fine resin layering particles may be formed of any well-known synthetic ion-exchange resin such as is described in connection with the synthetic resin support particles described above and in the '279 patent. Preferably, the layering particles will be formed of cross-linked polymers. The layering particles can be suitably formed from poly (vinylaromatic) resins, such as the copolymers styrene-divinylbenzene copolymer, divinylbenzene-vinylbenzylchloride copolymer, or methacrylate-vinylbenzylchloride copolymer. The layering particles may be selected from any of the known layering particles used for forming agglomerates for use as cation-exchange or anion-exchange compositions such as disclosed in the '279 patent.

The layering particles can be derived from a latex emulsion. In a preferred embodiment, the layering particles comprise a cross-linked polymer or copolymer containing about 0.25% to about 100% cross-linking monomer by weight. In its most preferred embodiment, the layering particles comprise a crosslinked polymer or copolymer containing between about 1% to about 5% cross-linking monomer by weight.

Preferably, the layering particles have a median diameter ranging from 0.002 to 0.08 microns, while the ratio of median diameters of support particles to layering particles ranges between 100 to 1, and 5,000 to 1, as described in U.S. Pat. No. 4,376,047 to Pohl (1983).

The dispersant material of the present invention is preferably chosen so that it contains functional sites which will irreversibly attach to both the support particles and layering particles. The dispersant inhibits or prevents agglomeration during suspension in the aqueous medium used for polymerization. In a most preferred embodiment, the dispersant comprises between about 0.1% to about 25% dispersant by weight in water.

The dispersant has ionizable sites which are un-ionized at a neutral pH and which are ionized at a highly basic or highly acidic condition. Thus, the dispersant does not include ionic sites such as sulfonates which are ionized at a neutral pH. By way of example, to make an anion-exchange composition, the dispersant can be an alcohol, preferably a polyvinyl alcohol, which is un-ionized at a neutral pH but which is deprotonated under highly basic conditions to form ion exchange sites which bind electrostatically to ion-exchange sites of opposite charge on the layering particles during attachment of the layering particles to the dispersant on the support particles to form produce the support particle—dispersant—fine layering particle ion-exchange composition of the present invention.

The irreversible attachment of the dispersant to the support particles may be accomplished by covalent bonding or permanent physical attachment as set forth at column 6, lines 3-54 of the '279 patent, incorporated by reference.

The term "irreversibly attached" as used herein means that most particles of dispersant will not be displaced from attachment to either the resin support particles or resin layering particles by solutions of strong electrolytes, or by shearing forces created such as when a liquid is passed through an ion-exchange bed using the novel composition of the present invention. "Irreversibly attached" as used herein includes attachment of the dispersant to the resin support particles by covalent bonding or permanent entanglement. "Irreversibly attached" as used herein also includes attachment of dispersant to fine resin layering particles by electrostatic forces at the time of attachment. The fine layering particles remain attached even after the pH is adjusted to a pH where the dispersant is no longer ionized. It is hypothesized that the fine layering particles remain attached even when the disperant is no longer in an ionized state due to the fact that polymeric dispersant and the fine layering particles become permanently entangled during the attachment process due to electrostatic attraction. "Irreversible attachment" excludes solely physical sorption.

A significant difference from the complex and mode of its formation from that of the '279 patent is the mode of irreversible attachment of the fine layering particles to the dispersant. As set forth above, polyvinyl alcohol is a preferred dispersant for making an anion-exchange composition. Other dispersants, such as polyvinylpyrrolidone, gum Arabic, or polyacrylamide may also be used so long as they include sites which are not ionized at neutral pH conditions and which are deprotonated or protonated and thus ionized at highly basic or highly acidic conditions.

The method of forming the ion-exchange complex includes forming the complex of the support particles irreversibly bound to the dispersant as set forth above. This complex is mixed with an aqueous slurry of fine layering particles with ion exchange sites of opposite charge to that of the ionized dispersant sites. For an anion-exchange composition using a polyvinyl alcohol, the ion exchange sites on the layering particle are basic, and irreversibly binding electrostatically to the deprotonated polyvinyl alcohol dispersant. Suitable ion-exchange sites on the surfaces of the layering particles include quaternary trimethylammonium, quaternary dimethylethanolammonium, and quaternary methyldiethanolammonium ion exchange sites. Preferred layering particles for an anion-exchange composition are quaternary amines with hydroxyl groups in the beta or gamma positions.

For the alcohol dispersant, suitable highly basic conditions are a pH of at least 12, preferably at least 12.5 to 14.0. The higher the pH during agglomeration of the layering particles, the higher the number of ionized alcohol sites. Preferably, the dispersant ionized sites are bound electrostatically to a large portion, e.g. greater than 10% of the fine particle ion-exchanging sites. This leads to a higher concentration of layering particles attached to the support particles. This, in turn, results in longer run times and, thus, the ability to increase the capacity of the chromatographic material for particular applications. Note that the term "run time" may also be referred to as "retention time," which represents the time required to elute a particular chemical species off of the chromatography column.

The invention is also applicable to cation-exchange compositions. Here, the dispersant is un-ionized at a neutral pH and ionized under highly acidic conditions, suitably at a pH of less than 3, preferably less than 2. Suitable dispersants of this type are polyvinylpyrolidone, polyacrylamide, and amine oxide polymeric dispersants. For cation-exchange composition, the ion-exchanging sites on the fine layering particles are acidic and irreversibly bind to the ionized sites on the dispersant under highly acidic conditions. Suitable ion-exchanging sites of this type include sulfonic acid or phosphonic acid cation exchange sites.

In one embodiment, the support particle—dispersant—fine layering particle complexes of the present invention can be formed prior to packing into a chromatography column. In a second, preferred embodiment, the complex of the support particles and dispersant is first packed into the chromatography column and then the layering particles are added to the column to form the three-part complex. A suitable method for performing the method of the second embodiment is as follows: 1. prepare a slurry of suitable particles containing attached dispersant in a mixture of surfactant and sodium hydroxide in an ultrasonic bath using a sufficient mass of particles to fill a column with at least a 10% excess. 2. Transfer the slurry to a slurry reservoir with an empty column attached below. 3. Pack the particles into the empty column by pumping the slurry into the column at high pressure, typically at flow rate at least 3 times the expected flow rate at which the column will be used. 4. The column is then removed from the slurry reservoir and an inlet end fitting is attached to the column. 5. A slurry of fine layering particles is dispersed in sufficient sodium hydroxide to bring the slurry pH to 14. 6. This slurry is then pumped through the packed column containing the dispersant coated particles at a low flow rate, typically 25% or less than the expected operating flow rate for the column. 7. Finally, excess fine layering particles are removed by rinsing the column with deionized water.

Advantages of either of the above methods over the prior art method of forming a three-part complex are that the methods of the present invention produce the compositions in a shorter time and are compatible with a large number of commercially available stationary phases using conventional electrostatic latex coating methods. Advantages of electrostatic binding of the layering particles to the support particle—dispersant complex in situ in a chromatography column include: improved chromatographic performance for polarizable ions such as iodide or perchlorate, better chromatographic performance with macromolecules such as proteins or DNA, and less carryover macromolecules such as proteins.

The resin support particles and fine resin layering particles are selected so that the ion-exchanging sites on the outer surfaces of the resin layering particles are sites that will exchange their ions for the ionic species which are to be removed from solution. Therefore, the composition can be prepared so that it has either cation- or anion-exchanging sites on the fine resin layering particles, depending on the nature of the ions desired to be removed from solution. Suitable cation- or anion-exchange layering particles are well known to those skilled in the art.

The ionic species to be resolved are passed through the column wherein the different ions are separated due to different degrees of attraction by the ion-exchange sites on the packing material. To remove the ions from the column, an eluent, also attracted to such sites, is passed through the column to drive the ions so that they may be collected for analysis. Typically, these eluents have the same charge as the ions to be resolved and are a different chemical type.

The ion-exchange composition of the present invention is particularly useful as packing material for columns to chromatographically separate ionic species of opposite charge in a solution by differential retention on the column. This can be accomplished by contacting such a solution with a chromatographic column including a packed bed of ion-exchange particles formed of the composition of the present invention. The ion-exchanging sites on the particles attract the ions to be removed from solution.

The ranges of eluents to be employed, their flow rates and parameters of the ion-exchange chromatography are well known to those skilled in the art.

In order to illustrate the present invention, the following non-limiting examples of its practice are provided.

Example 1

Preparation of Resin Support Particle-Dispersant Complex (Covalent or Permanent Entanglement).

A solution of 20 grams of 75 percent benzoyl peroxide in a mixture of 230 grams of divinylbenzene (containing 55% of actual divinylbenzene) and 230 grams ethylvinylbenzene can be dispersed in the form of fine droplets in 1600 mL of an aqueous solution containing water and 8 grams of polyvinylalcohol (Polysciences Inc. catalog #4398, 125,000 grams/mole, 88% hydrolyzed). The whole mixture can be protected from air by maintaining an atmosphere of nitrogen within the reaction vessel. The mixture can be heated to 80° C. and held at this temperature for twenty hours during which time polymerization takes place. Liquid can be drained from the resin particles and then can be washed with water to remove water soluble products to yield a white opaque polymer in the form of spherical particles.

Example 2

Preparation of Latex Derived Layering Particles—(Cationic Surfactant)—Functionalized with Anion Exchange Groups An aqueous solution was prepared with 30.5 grams of water, 0.13 grams of sodium bicarbonate, 0.13 grams of potassium persulfate, and 4.5 grams of a 12.5% AEROSOL® MA solution (sodium dihexyl sulfosuccinate) while being purged with nitrogen. Next, 8.29 grams of vinylbenzylchloride, 0.91 grams of divinylbenzene (containing 55% of actual divinylbenzene) and 0.40 grams of diethyl vinylphosphonate was added to the aqueous solution while being stirred to form an emulsion and maintaining the nitrogen purge. 3 grams of a 10% sodium metabisulfite solution was added to the aqueous solution while being stirred and maintaining the nitrogen purge. The whole mixture was placed in a 16 oz. narrow neck bottle and deairated with nitrogen for five minutes. The bottle was capped and tumbled in a water bath held at 32° C. for 18 hours to complete the polymerization and form the latex. 6.84 grams of a 70% Triton X-405 (ethoxylated nonylphenol) solution was added to the latex and stirred to stabilize it. The white opaque mixture was filtered through a #4 filter paper to remove any coagulum from the latex. The latex was functionalized by adding 86.12 grams of 1 M 1,4-diazabicyclo (2.2.2)octane to the 47.86 grams of latex, stirring the mixture for 5 minutes, and then placing the mixture in the oven for 24 hours at 85° C. The resulting latex or fine layering particles were 5% crosslinked with divinylbenzene and 95% vinylbenzylchloride and were functionalized with the di-tertiary amine 1,4-diazabicyclo (2,2,2) octane. The final size of the aminated latex was around 235 nm.

Example 3

Preparation of Resin Support Particle-Dispersant Complex Agglomerated with Latex.

A resin support particle-dispersant complex similar to Example 1 was dried so that it contained less than 2% water moisture. The resin support particles in this case was a 6 μm resin prepared with 55% divinylbenzene where polyvinyl alcohol (PVA) was used as the dispersant during synthesis. 15 grams of dry resin support particles were added to 100 grams of methanol, and sonicated for 15 minutes to form a mixture of resin support particles and methanol. Next, 100 grams of DI water was added to the resin/methanol mixture and stirred for 5 minutes. This resin/methanol/water mixture was then filtered to form a moist cake of filtered resin. This filtered resin was then washed two times with DI water. 3 grams of filtered resin was diluted with 12 grams of pH 14 (1 M NaOH) aqueous solution forming a NaOH/resin mixture. This NaOH/resin mixture was sonicated for 5 minutes to ensure good mixing. While stirring this NaOH/resin mixture, 2 grams of anion exchange latex solution from Example 2 was added and stirred for 15 minutes to form the agglomerated resin. The agglomerated resin was filtered and then washed with 20 grams of pH 14 aqueous solution. The agglomerated resin was slurried in 50 grams of pH 14 aqueous solution, stirred for 5 minutes, and then filtered. Next, this step was repeated where the resin was re-slurried with 50 grams of pH 14 aqueous solution, stirred for 5 minutes, and then filtered. After filtration, a slurry-wash step was performed three times with an acetone/aqueous base solution. The slurry-wash step includes creating a slurry of resin with a 50/50 mixture of acetone and pH 14 aqueous NaOH solution (20 grams each), stirring for 5 minutes, filtering the stirred slurry, and washing with the same 50/50 mixture (40 grams total). This agglomerated resin was washed two times with deionized water (not pH adjusted) and then packed into a chromatography column, which was used for FIG. 2.

Figure 3:
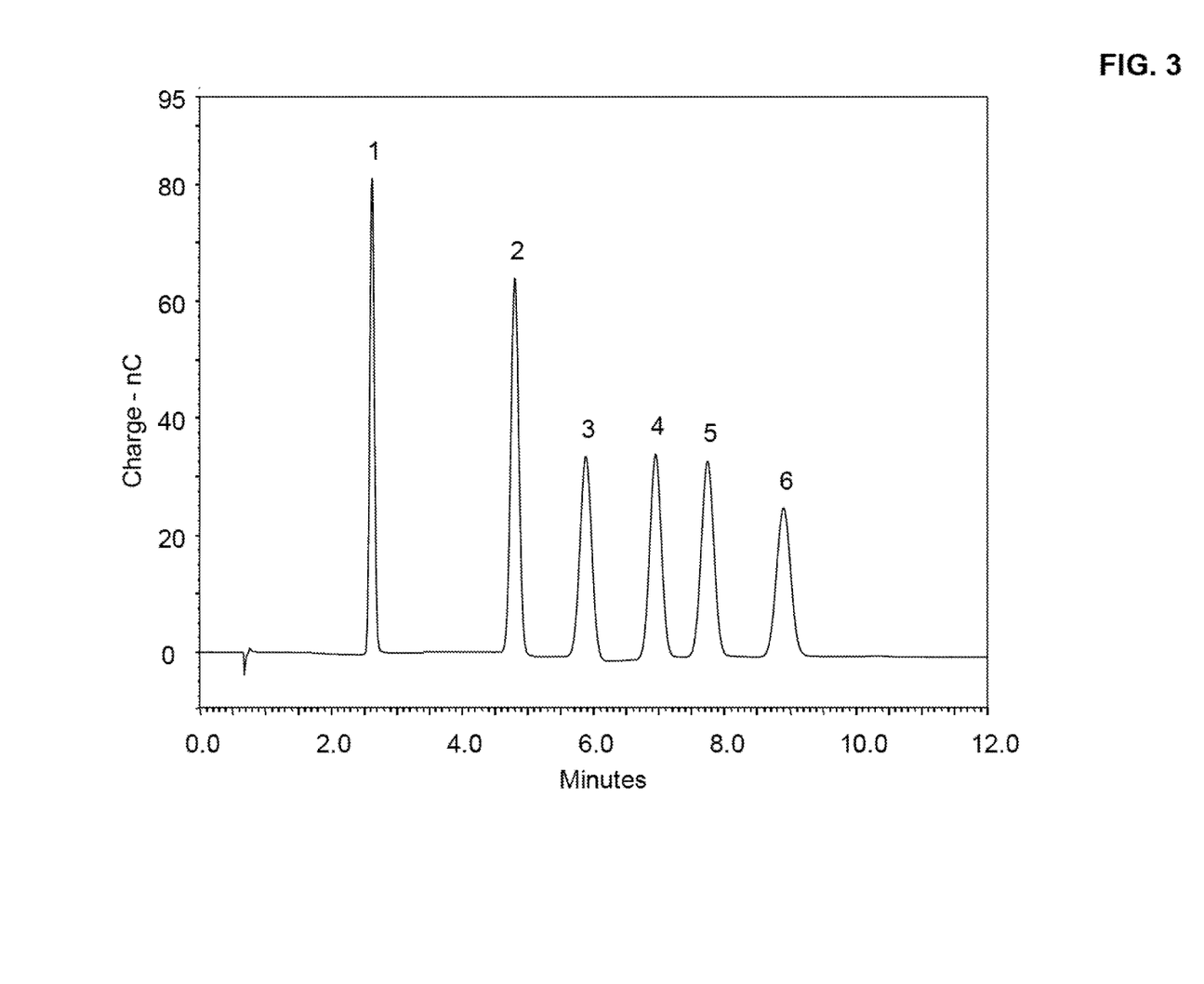
FIG. 3 illustrates a chromatogram using a column according to the invention.
Figure 4:
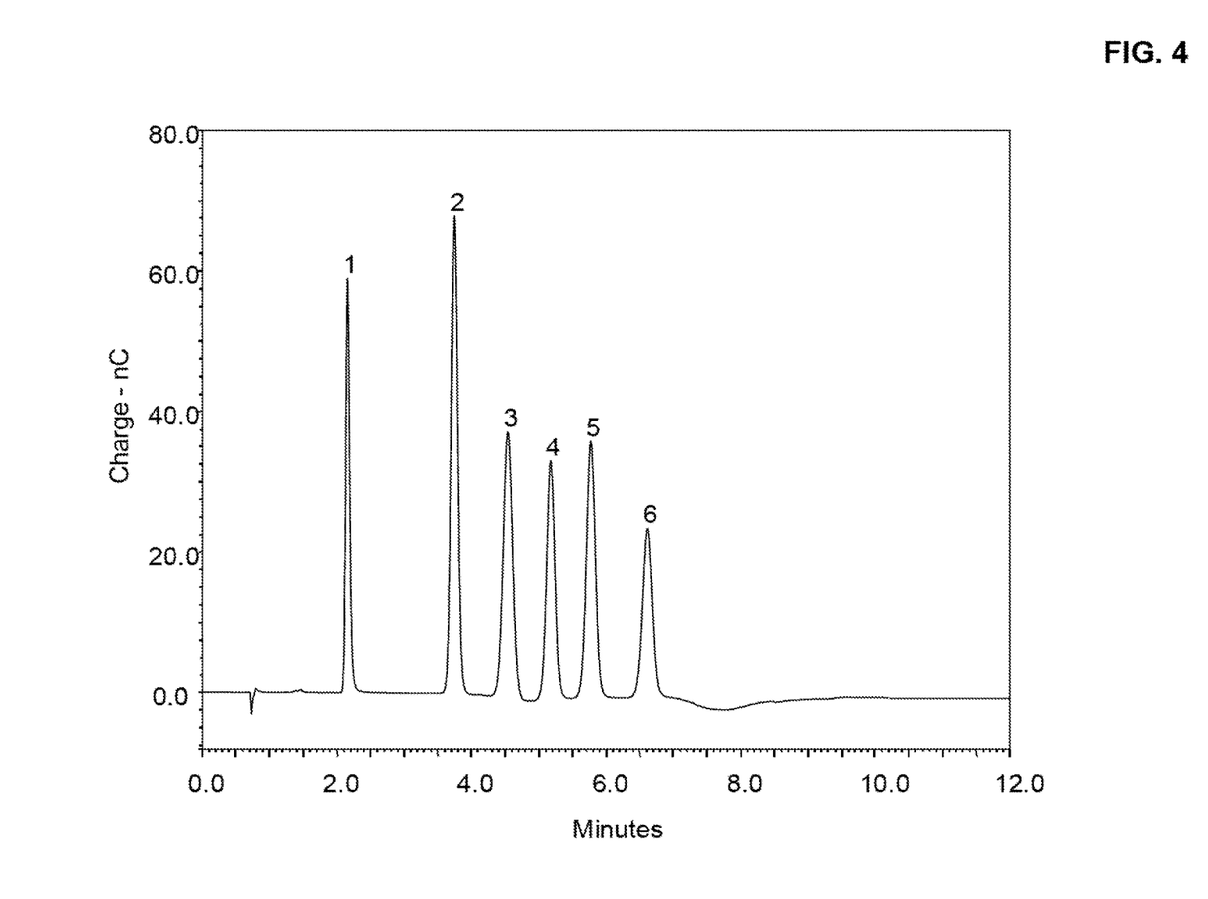
FIG. 4 illustrates a chromatogram using a column according to the invention.
Figure 5:
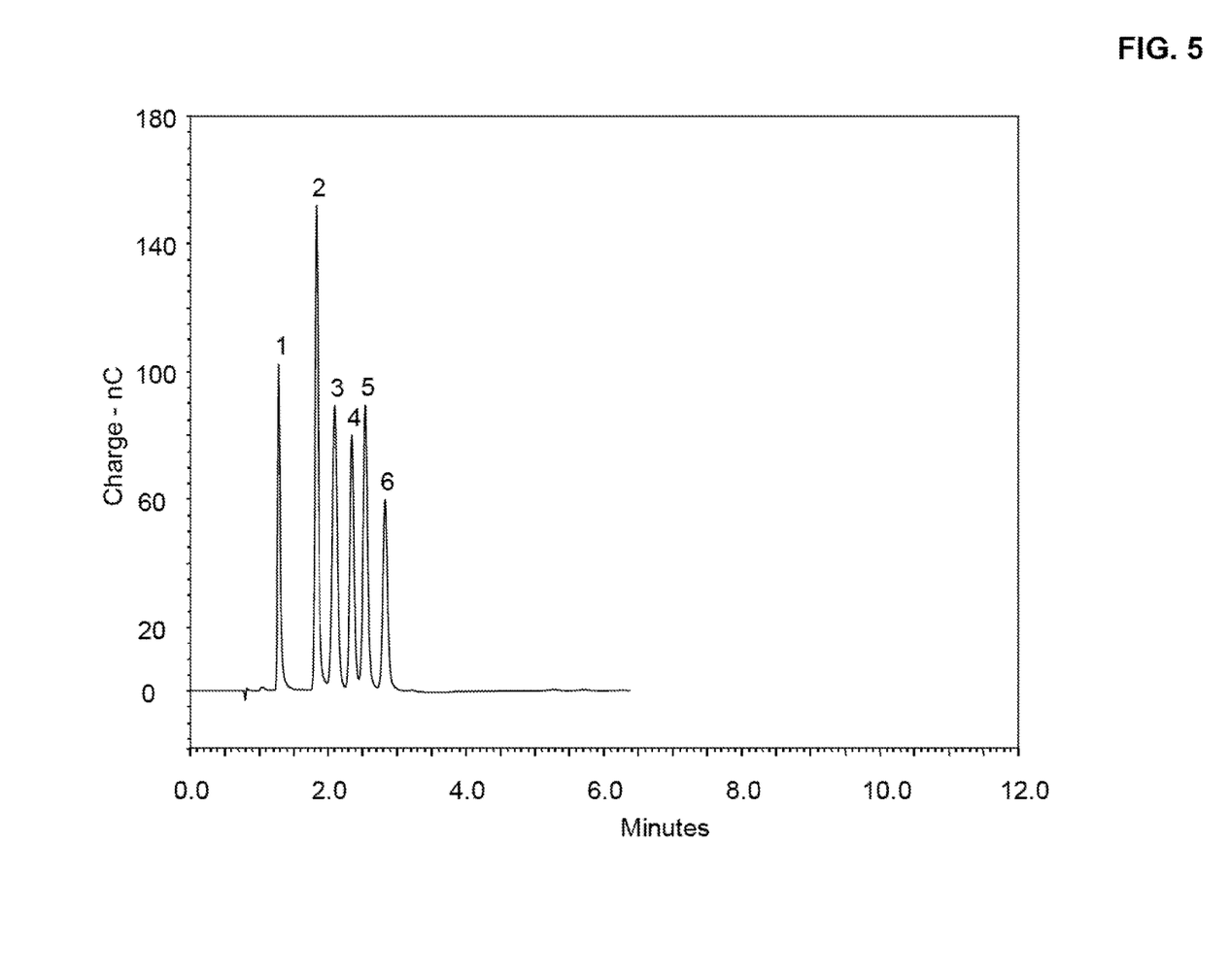
FIG. 5 illustrates a chromatogram using a column according to the invention.
Figure 6:
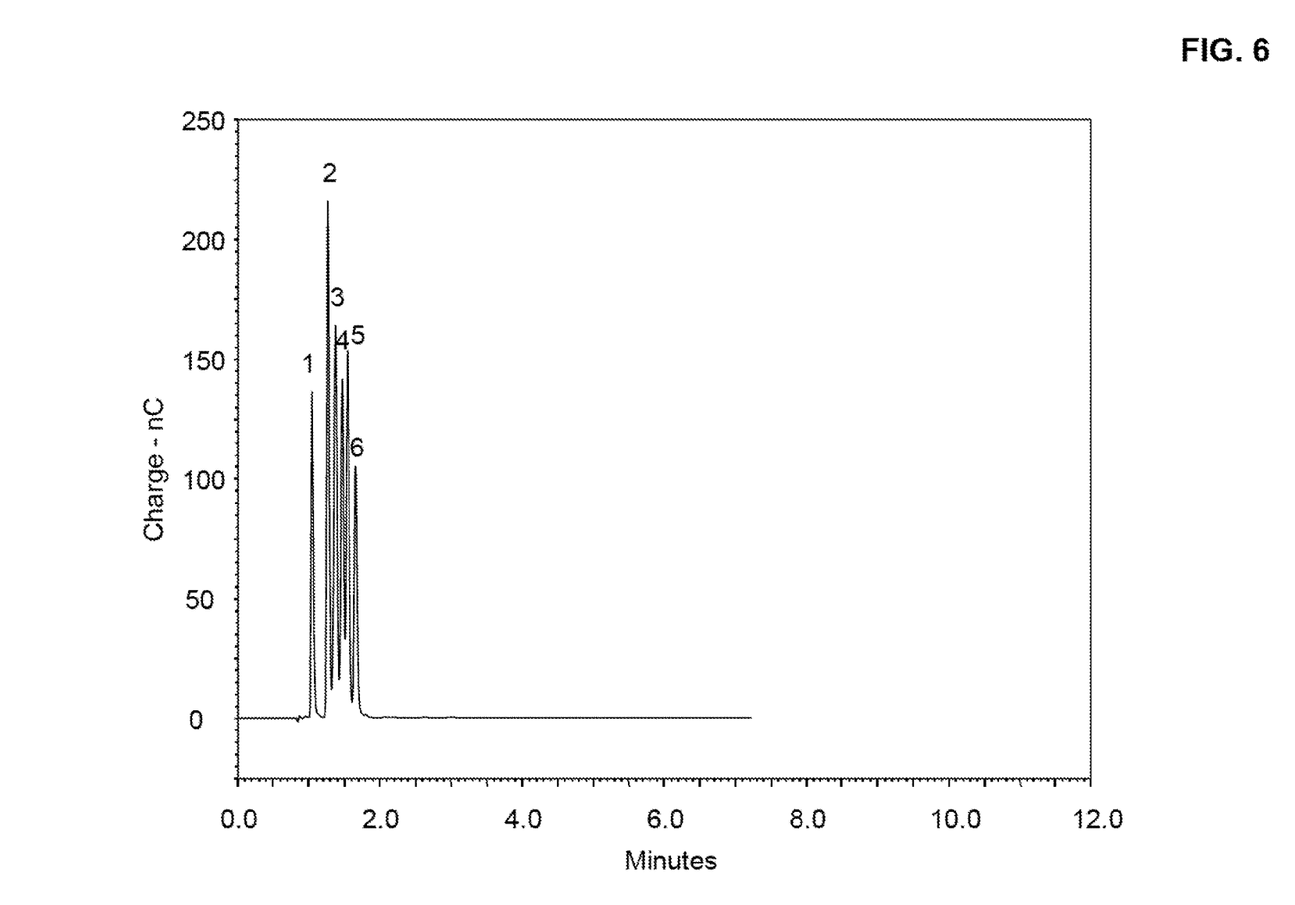
FIG. 6 illustrates a chromatogram using a column according to the invention.

A similar process was used for preparing the chromatography columns used for FIGS. 3-6, except that the NaOH solutions used for creating the NaOH/resin mixture were at pH 13.5 (0.32 M NaOH) for FIG. 3, pH 13 (0.10 M NaOH) for FIG. 4, pH 12.5 (0.032 M) for FIG. 5, and pH 12.0 (0.01M NaOH) for FIG. 6. The agglomerated latex complexes for pH 13.5, 13, 12.5, and 12 were washed and slurried similar to the agglomerated latex complex for pH 14 except that the wash solution, slurry solution, and an aqueous portion of the acetone/aqueous base solution had a pH similar to the agglomeration pH. Similar to the pH 14 agglomeration, these agglomerated latex complexes were washed two times with deionized water (not pH adjusted) and then packed into a chromatography column.

Example 4

(Chromatogram of Ion-Separation Using a Prior Art Chromatography Column.)

In this example, a commercial surface-sulfonated CarboPac™ PA20 (3×150 mm) column sold by Dionex Corporation was used. It is made generally by the method described in U.S. Pat. No. 6,248,798. An electrochemical cell (Dionex ED50) was used with a quadruple waveform shown in Table 1 below.

TABLE 1

| Time (sec) | Potential (V) vs. Ag/AgCl | Integration |
|---|---|---|
| 0.00 | +0.1 | |
| 0.20 | +0.1 | Begin |
| 0.40 | +0.1 | End |

TABLE 1-continued

| Time (sec) | Potential (V) vs. Ag/AgCl | Integration |
|---|---|---|
| 0.41 | −2.0 | |
| 0.42 | −2.0 | |
| 0.43 | +0.6 | |
| 0.44 | −0.1 | |
| 0.50 | −0.1 | |

Figure 1:
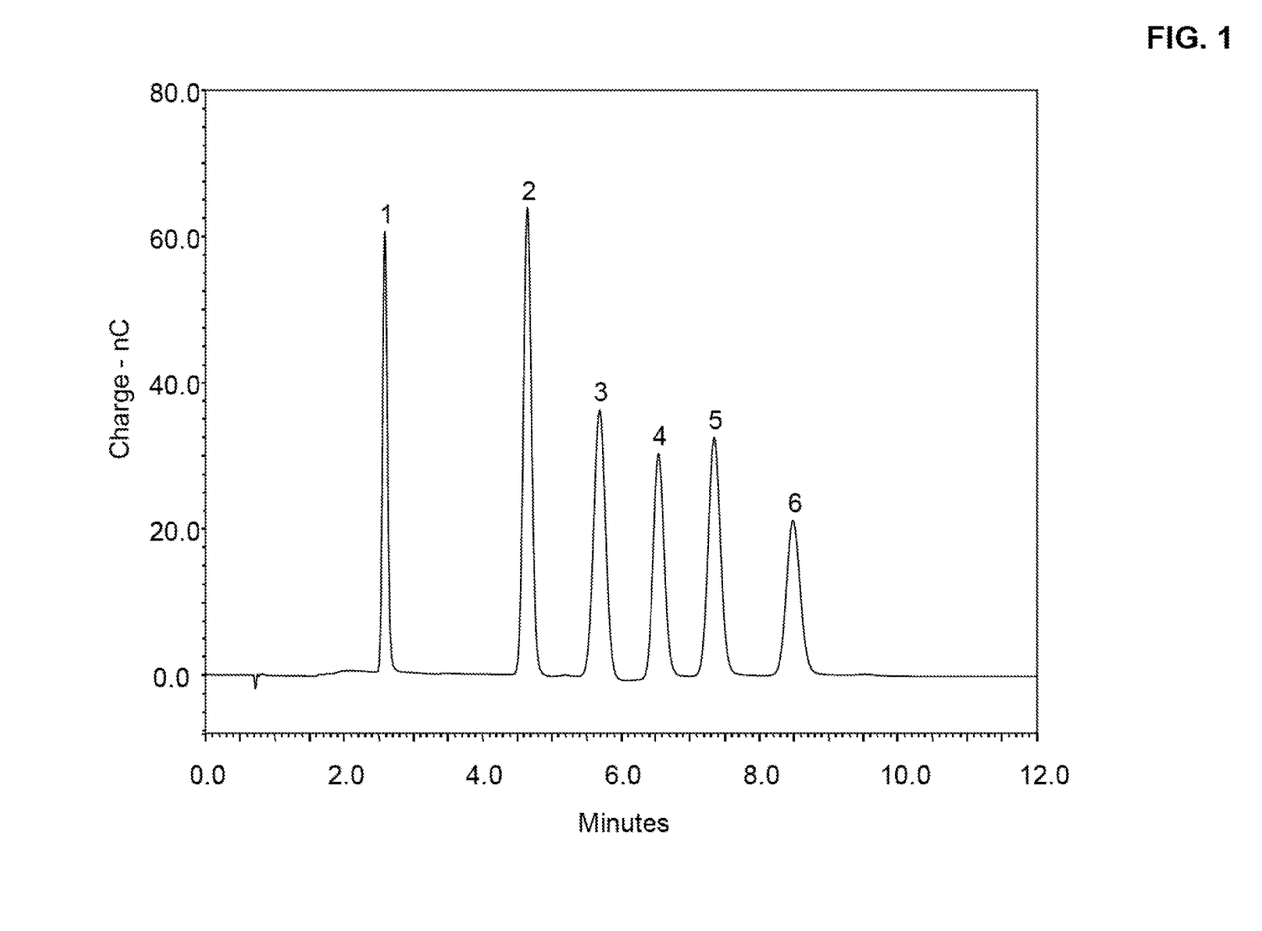
FIG. 1 illustrates a chromatogram of a separation using a prior art CarboPac™ PA 20 3×150 mm column, in which the surface of the support particles are first sulfonated to create the negative surface to which positively charged latex particles attach electrostatically.

The parameters of the separation are as follows.
Column: CarboPac PA20
Eluent: 10 mM KOH
Eluent Source: Dionex EGC 500 KOH cartridge
Flow Rate: 0.5 mL/min
Inj. Volume: 10 μL
Gasket: 2 mil
Temperature: 30° C.
Detection: Integrated Amperometry, quadruple pulse waveform
Working Electrode: PTFE Gold, disposable electrode
Reference Electrode: Silver/Silver Chloride
Standard: 10 mg/L concentration for the below listed analytes
Peaks:
1. Fucose
2. Galactosamine
3. Glucosamine
4. Galactose
5. Glucose
6. Mannose The chromatogram of the separation is shown in FIG. 1. Note that the y-axis represents the measured charge in nanocoulombs (nC).

Example 5

(Separation Using a Complex According to the Present Invention.)

The column (3 mm inner diameter×150 mm length) column was packed with the complex of Example 3 where the agglomeration was performed at a pH of 14.0. Other parameters are as follows:
Column: Resin of Example 1, agglomerated at pH 14
Eluent: 10 mM KOH
Eluent Source: Dionex EGC 500 KOH cartridge
Flow Rate: 0.5 mL/min
Inj. Volume: 10 μL
Gasket: 2 mil
Temperature: 30° C.
Detection: Integrated Amperometry, quadruple pulse waveform
Working Electrode: PTFE Gold, disposable electrode
Reference Electrode: Silver/Silver Chloride
Standard: 10 mg/L concentration for the below listed analytes
Peaks:
1. Fucose
2. Galactosamine
3. Glucosamine
4. Galactose
5. Glucose
6. Mannose.

Figure 2:
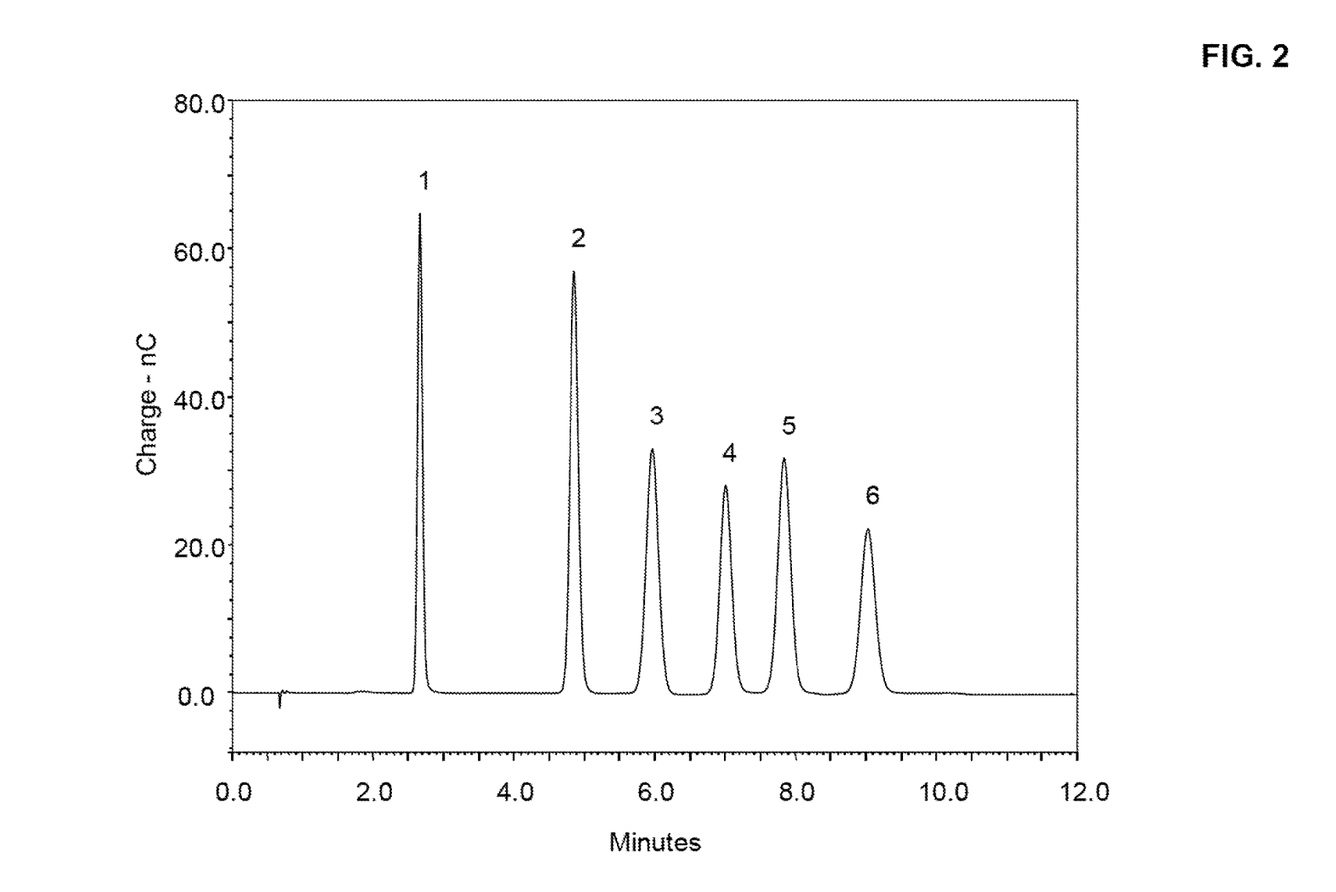
FIG. 2 illustrates a chromatogram using a column according to the invention.

The chromatogram of the separation is shown in FIG. 2.

Example 6

This Example is the same as Example 5 except that the agglomeration was performed at a pH of 13.5. The chromatogram of the separation is shown in FIG. 3.

Example 7

This Example is the same of Example 5 except that the agglomeration was performed at a pH of 13.0. The chromatogram of the separation is shown in FIG. 4.

Example 8

This Example is the same as Example 5 except the agglomeration was performed at a pH of 12.5. The chromatogram of the separation is shown in FIG. 5.

Example 9

This Example is the same as Example 5 except the agglomeration was performed at a pH of 12.0. The chromatogram of the separation is shown in FIG. 6.

Example 10

Figure 7:
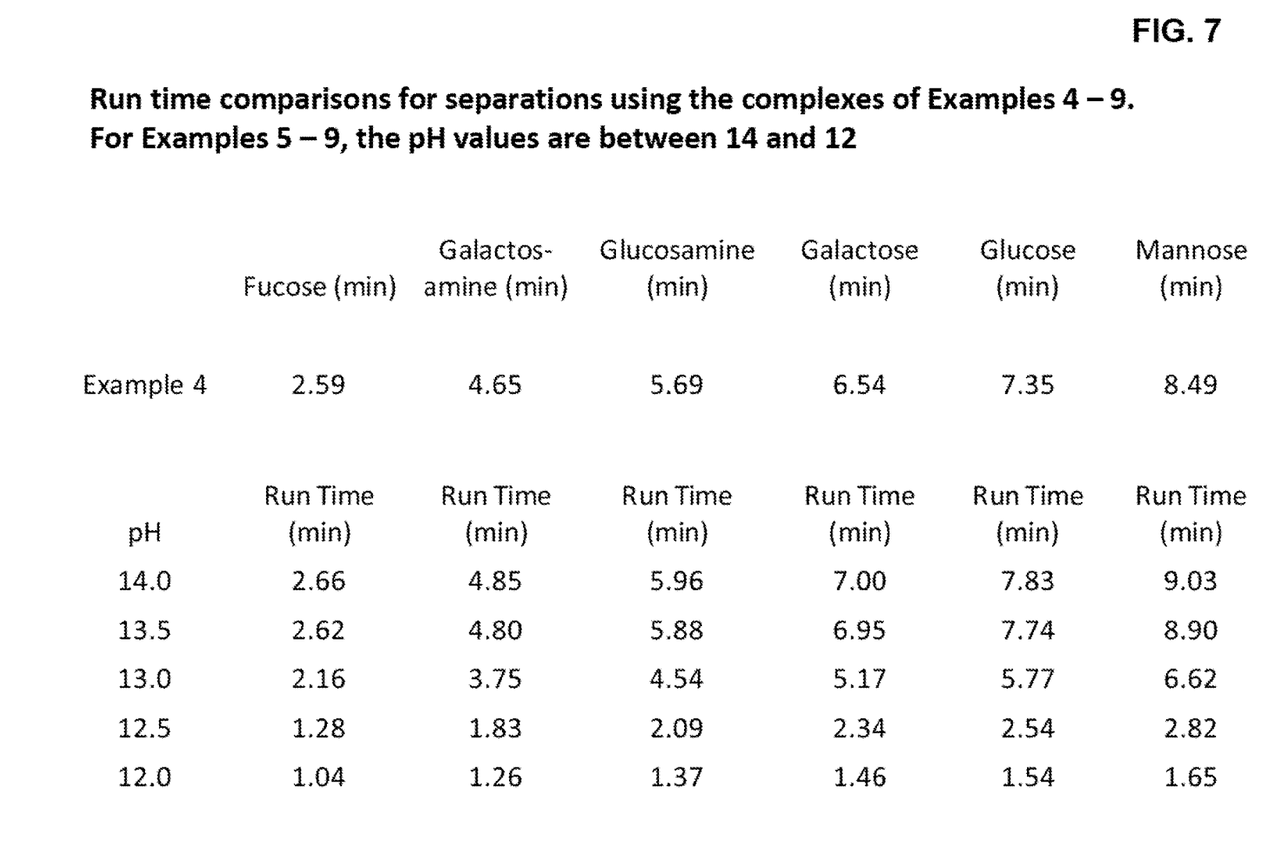
FIG. 7 is a table comparing run times of columns agglomerated at various pHs according to the invention.
Figure 8A:
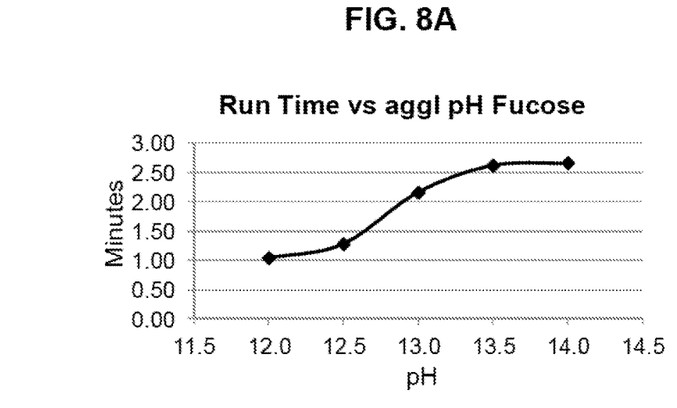
FIG. 8A-FIG. 8D are charts comparing run times of columns agglomerated at various pH levels according to the invention.
Figure 8B:
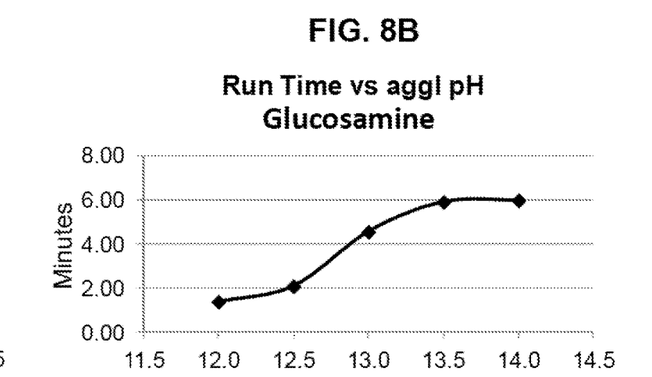
Figure 8C:
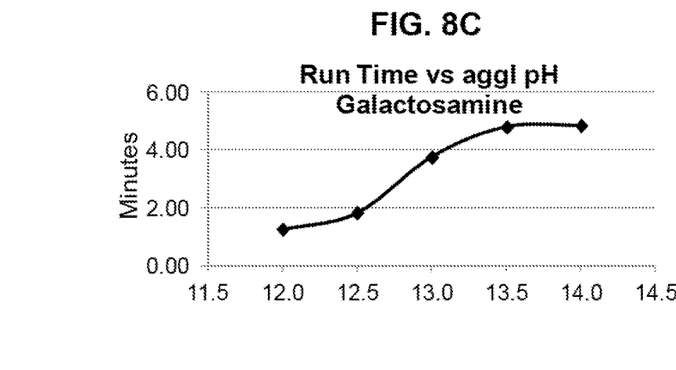
Figure 8D:
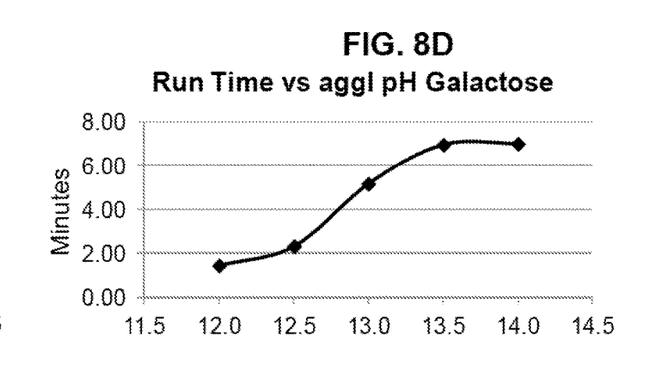
Figure 9A:
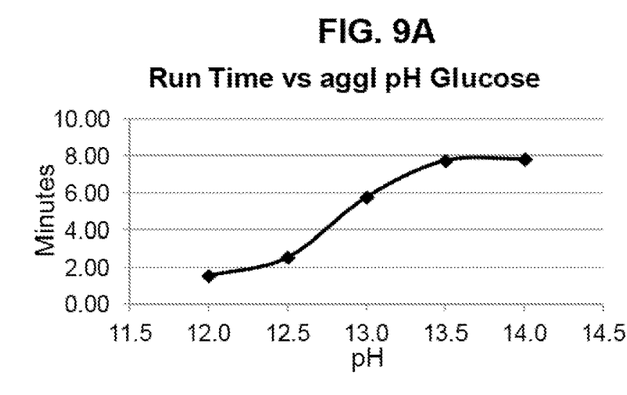
FIG. 9A and FIG. 9B are charts comparing run times of columns agglomerated at various pH levels according to the invention.
Figure 9B:
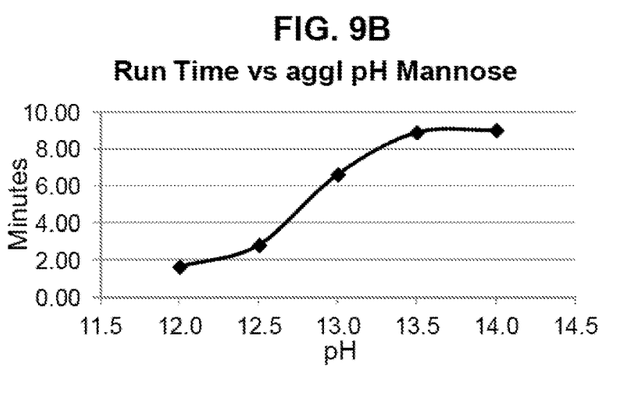

FIG. 7 is a table comparing run times (minutes) and pHs for Examples 5-9.

FIGS. 8A-8D and 9A and 9B are charts illustrating run times and agglomeration (agg1) pHs for Examples 5-9, in accordance with the table of FIG. 7.

What is claimed is:

1. A method of producing an ion-exchange composition suitable for use in ion exchange chromatography, said method comprising the steps of:
    (a) forming a first complex of neutral vinyl polymer support particles irreversibly bound to a dispersant, said dispersant having ionizable sites which are un-ionized at a neutral pH and which are ionized under highly basic or highly acidic conditions and said dispersant selected from the group consisting of polyvinyl alcohol, polyvinylpyrrolidone, and polyacrylamide,
    (b) packing the first complex into a chromatography column,
    (c) forming a mixture of said first complex with an aqueous slurry of fine layering particles, functionalized with ion-exchanging sites on the surfaces of said fine layering particles, at said highly basic or highly acidic conditions so that said dispersant includes said ionized sites, and
    (d) electrostatically binding said dispersant ionized sites to a portion of said fine particle ion-exchanging sites to produce a support particle-dispersant-fine layering particle complex.

2. The method of claim 1 in which said highly basic conditions are at a pH of at least 12 and said highly acidic conditions are at a pH of less than 3.

3. The method of claim 1 in which said dispersant is a polyvinyl alcohol with alcohol groups deprotonated to produce said ionized sites.

* * * * *